March 26, 1968  E. HAILE  3,374,574
SECTIONAL PLANTER

Filed June 21, 1966  2 Sheets-Sheet 1

INVENTOR.
ERNEST HAILE
BY
*Sperry and Zoda*
ATTORNEYS.

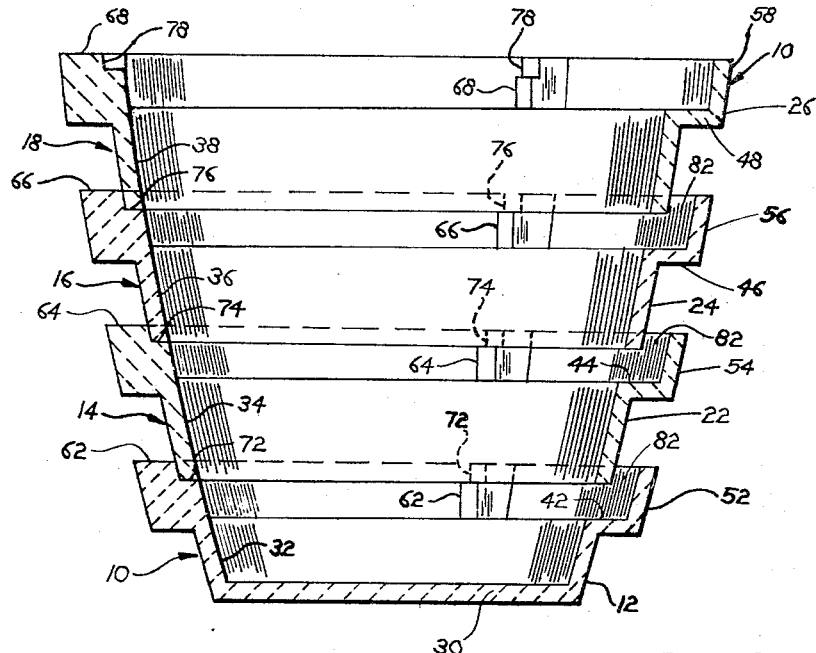

United States Patent Office 3,374,574
Patented Mar. 26, 1968

3,374,574
SECTIONAL PLANTER
Ernest Haile, 30 Cadwallader Terrace,
Trenton, N.J. 08618
Filed June 21, 1966, Ser. No. 559,192
8 Claims. (Cl. 47—34.12)

ABSTRACT OF THE DISCLOSURE

A series of separately formed, interfitting, open-bottomed, annular dished sections are stacked one upon another to a selected height, to produce a planter the interior of which is continuous in the sense of being wholly unbroken by dividers or partitions. Earth is thus retained by the planter in a correspondingly continuous and unbroken, solid core. The sections are so formed that when stacked to a selected height, they expose the earth at the side of the planter throughout its circumference at each of the several levels occurring between adjacent superimposed sections, to permit both side and top planting.

---

This invention relates generally to planters, and more particularly has reference to a planter comprising a plurality of sections, that can be assembled to provide planters of various, selected depths having a selected number of peripherally disposed planting areas spaced vertically of the device in communication with the interior thereof.

The main object of the present invention is to provide a planter construction that comprises separately formed, interfitting sections that in effect permit the purchaser to make a planter to the purchaser's own design so far as the size of the planter, and the number of circumferential planting areas are concerned.

Another object is to accomplish the above with a single, basic type of planter section.

A further object is to design said basic section in such a fashion as to facilitate its being pressed or molded in a wide range of sizes, and from any of various materials, including concrete, clay, phenolic resins, etc.

Still another object is to provide a planter of the character described that will be capable of swift and easy assembly, by reason of the design of the sections in a fashion that automatically centers each section in respect to the one next below the same.

Still another object is to provide a planter as stated wherein the sections will each be designed in such fashion as to automatically produce continuous, peripheral planting areas between adjacent, superposed sections, said peripheral areas communicating freely with the interior or main planting cavity of the device. In this way, it is proposed that the attractiveness of the planter be materially enhanced, in that plants will grow therefrom not only out of the top of the planter, but also, out of the several, vertically spaced, peripherally extending auxiliary planting areas.

Still another object of importance is to provide a device of the character stated which will be capable of manufacture in various exterior shapes without departure from the above-described concepts. Thus, in carrying out this object of the invention, the design of the sections can be such that when assembled, they will define a tapered planter. Or, alternatively, the planter can have vertical sides. Still further, in carrying this object it is proposed that any of various other exterior shapes be produced as desired by the purchaser, as for example the alternation of smaller diameter sections with larger diameter sections, the provision of square sections in which each is angularly offset 45° in respect to the similarly shaped sections immediately above and below the same, etc.

Summarized briefly, the invention comprises a plurality of hollow planter sections which, when stacked or superimposed one upon another, will define a receptacle of a depth that various according to the number of sections used. The sections are so designed as to define circumferentially extending, auxiliary planting areas spaced vertically of the device when the sections are assembled as described. These auxiliary areas, extending around the sides of the planter, are such as to permit one to have plants growing out of the side as well as out of the top of the planter. The side or auxiliary planting areas are defined by reason of relatively offset portions of the side walls. The device includes, further, means for interfitting the sections in a concentric relationship.

Other objects will appear from the following description, the claims appended thereto, and from the annexed drawings, in which like reference characters designate like parts throughout the several views, and wherein:

FIG. 3 is a vertical sectional view therethrough substantially on line 3—3 of FIG. 1; and FIG. 4 is a vertical sectional view on line 4—4 of FIG. 1, the planter being shown as it appears in use, filled with earth and with plants growing therefrom.

Figure 1:
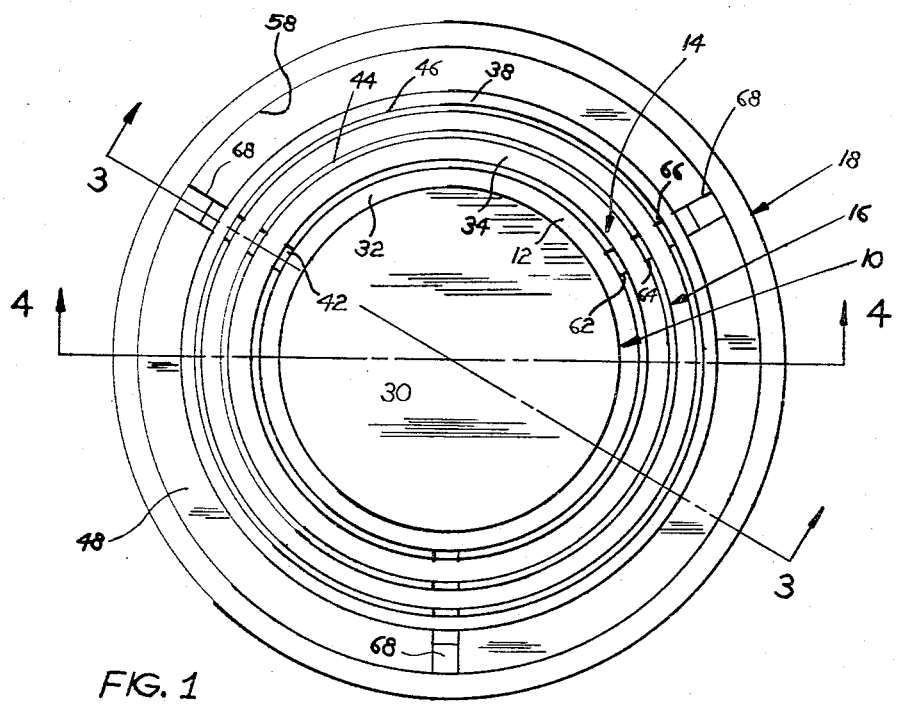
FIG. 1 is a top plan view of a sectional planter, according to the present invention.

Referring to the drawing in detail, the planter includes a bottom section generally designated 10, molded or otherwise formed, in the illustrated example, from a ceramic material. It will be understood at this point, however, that the material of the invention can be varied according to the desires of the particular manufacturer. For example, plastic could be used, or any other material having the requisite characteristics of strength, durability, adaptability to be formed to the desired shape, etc.

Figure 2:
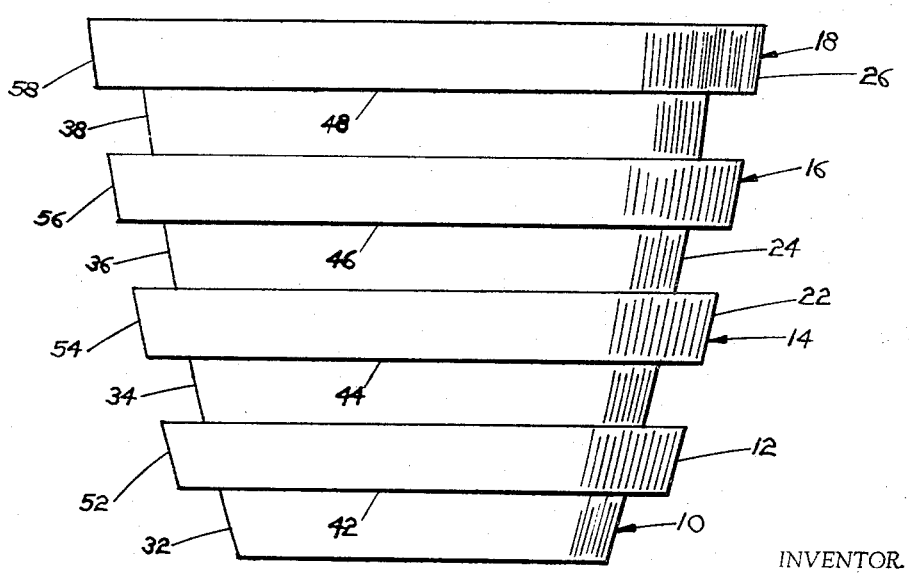
FIG. 2 is a side elevational view thereof.

In any event, in FIGS. 1 and 2 the invention has been illustrated as including a bottom section generally designated 10, formed with a continuous, circular side wall 12.

In superimposed, concentric, vertically stacked relation are upper sections generally designated 14, 16, 18. These would be identical to one another if desired, and could also be identical to the bottom section 10, except for the fact that the bottom section would generally have a closed bottom, as distinguished from the upper sections, which are formed open at top and bottom.

The upper sections 14, 16, 18 are formed with side walls 22, 24, 26, respectively.

As shown, bottom section 10 is formed with a flat, closed bottom 30. This could, of course, be apertured for drainage purposes if desired, this being considered sufficiently obvious as not to require special illustration herein.

It is important to note the particular construction of the side walls 12, 22, 24, 26. These include circular, lower wall portions 32, 34, 36, 38, respectively. The lower wall portions are progressively increased in diameter from their lower to their upper edges, in the illustrated example of the invention.

At their upper edges, the lower wall portions 32, 34, 36, 38, merge into and are integral with horizontally outwardly extending, annularly shaped intermediate portions 42, 44, 46, 48, respectively. The intermediate portions in the illustrated example are disposed in horizontal planes, but could if desired slope upwardly in a direction radially outwardly from the center of the planter.

At their outer edges, the intermediate portions 42, 44, 46, 48, are integral with and merge into upwardly outwardly extending upper wall portions 52, 54, 56, 58, respectively. In each side wall, by reason of the connecting, intermediate portion each upper wall portion is offset outwardly in respect to the inner wall portion of said side wall, that is, it is offset radially of the annular section in respect to said inner wall portion.

Angularly spaced support lugs 62, 64, 66, 68 are formed upon the sections 10, 14, 16, 18, respectively. The support lugs are vertically disposed, and in the illustrated example there are three support lugs on each section. This number, however, can be varied, although it is believed that for stability, there should be a minimum of three support lugs. The number could be increased if this should be so desired to assure maximum strength in the assembled device.

Each support lug, as will be noted from FIG. 1, extends radially of the section on which it is formed, ascending (see FIG. 3) from the intermediate portion of the section. The support lugs of each section, in the illustrated example, have their inner side edges flush with the inner surfaces of the lower wall portion of the section, and the top edges of the support lugs are flush with the top edges of the upper wall portion. The support lugs extend inwardly from the upper wall portions, and right angular notches 72, 74, 76, 78, of support lugs 62, 64, 66, 68, respectively are formed at the upper ends of the inner side edges of the lugs. The notches are of a width substantially equal to the thickness of the lower wall portions.

By reason of this arrangement, and assuming that one were to desire a planter of a particular height, he would utilize a single bottom section 10, together with whatever quantity of upper sections is needed to erect the planter to the desired height.

To assemble the planter, one merely positions each section upon the one next below the same. As a result, the support lugs 62 of the bottom section, and more particularly the notches 72 of said lugs, receive and are in supporting relation to the bottom edge of the section 14 next above the bottom section 10. Then, section 16 is positioned upon the support lugs 64 of the section 14 already supported by bottom section 10. The process continues until the planter has been erected to the desired height.

It will be seen that in this way, although the device comprises two basic sections, namely a bottom section and an upper section, one can assemble planters of various heights, swiftly and easily. There is no necessity to make a physical or mechanical connection of any section to the one next above or below the same. One merely allows each section to rest upon the support lugs of the section next below.

The support lugs are so formed as to cause each section to be centered in respect to the section next above and the section next below the same. This occurs automatically, responsive merely to positioning of each device upon the support lugs of the lower section, in engagement with the notches thereof.

The assembled device is filled with earth E or other suitable planting material. It is a characteristic of the invention, in this regard, that by reason of the particular construction, involving relatively offset upper and lower portions of each side wall, peripheral, auxiliary planting areas or pockets 82 are defined, in vertically spaced relation. Thus, in the space between adjacent upper sections 16, 18, earth E¹ is exposed, from which plants P¹ may grow. In the peripheral planting area defined between section 14 and section 16, a similar peripheral planting area exposes earth E², from which plants P² may grow. In the area between sections 10 and 14 plants P³ grow from earth E³.

As will be apparent, the peripheral areas extend continuously about the planter, except for the provision of the uniformly, angularly spaced, radial support lugs.

The planter also includes a main planting cavity 84, containing the earth E, and communicating freely with the peripheral planting areas. Plants P grow out of the main planting cavity, through the open top of the planter.

When water or plant food is supplied at the top of the planter, the moisture or plant food is distributed to the peripheral planting areas automatically, by reason of the free communication between the main and auxiliary planting areas.

The arrangement, as noted above, has the desirable characteristic of permitting a wide variety of planter arrangements to be produced though one utilizes only two basic types of sections, a bottom and an upper section. In fact, the sections could be pressed from ceramic dies or plastic molds except for the provision of the space between the mold or die sections required to produce the bottom 30, should all sections be of the same diameter.

It is believed possible, also, to alternate sections of different diameters. Thus, instead of progressively larger upper sections superimposed upon one another, there could be two types of upper sections, alternating vertically of the planter. In this instance, the lower wall portion of these two types of sections would be of the same diameter, but the upper wall portions would be of different diameters. Or, each upper section could be of a slightly greater diameter than the section next below the same, despite the maintenance of verticality of the side walls thereof.

It will thus be apparent that a wide variety of different arrangements can be provided, from a relatively small number of different types of planter sections. In every instance, however, the relatively offset portions of the side wall of each section, and the manner of supporting each lower wall portion upon support lugs extending inwardly from the upper wall portion of the section next below the same, remains unchanged, and facilitates the assembly of the device to a particular height and in a particular combination of sections, according to the desires of the purchaser, with every arrangement providing the vertically spaced, auxiliary or side planting areas as described above.

In the illustrated example, which is the preferred embodiment of the invention, by reason of the flaring formation of the several wall portions, the planter, when assembled, has a correspondingly upwardly flaring construction, so that the main planting area, communicating with auxiliary planting areas defined between adjacent sections, is progressively increased in diameter in a direction toward the top of the planter.

One might if desired use other than a circular shape for the sections. The inventive concept, however, as previously described herein, remains intact, in that a plurality of separately formed sections are supported one upon another, and have relatively offset wall portions so related as to define peripheral planting areas between adjacent sections, communicating freely with a main planting cavity.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. A planter comprising a plurality of superposed, hollow, separately formed sections each of which is in supporting relation to the section next above the same to form a main planting cavity, said sections including a bottom section and a plurality of upper sections, at least the upper sections having an open bottom and a central soil-receiving space communicating with similar spaces of the sections above and below the same through the open bottoms thereof to define said main planting cavity, each section including a side wall having radially offset wall portions to define, between adjacent sections, peripheral planting areas auxiliary to said main cavity, said offset wall portions including an upper wall portion and a lower wall portion offset inwardly therefrom to define said auxiliary area between the upper wall portion of one section and the lower wall portion of the next higher section.

2. A planter as in claim 1 wherein each section includes support means on at least one of said wall portions thereof extending into engagement with an adjacent section to effect said support of each section upon the section next below the same.

3. A planter as in claim 2 wherein said support means comprises lugs extending from one wall portion of each side wall in position to engage one of the wall portions of the next higher section.

4. A planter as in claim 3 wherein said support lugs include means to center each section in respect to the section supporting the same.

5. A planter as in claim 4 wherein said means of the support lugs comprise notches receiving the adjacent wall portion of the next higher section.

6. A planter as in claim 5 wherein said lugs are angularly spaced about the side wall of each section.

7. A planter as in claim 6 wherein each of said lugs is formed upon and extends inwardly from the upper wall portion of each section.

8. A planter as in claim 2 wherein the lower wall portion of each side wall is offset from the upper wall portion thereof continuously throughout the periphery of the side wall section whereby each auxiliary planting area is correspondingly continuous throughout said periphery.

References Cited

UNITED STATES PATENTS

| | | | |
|---|---|---|---|
| 253,716 | 2/1882 | Johnson | 47—34.12 |
| 262,335 | 8/1882 | Wagner | 47—34.12 |
| 3,076,289 | 2/1963 | Gallo | 47—34.12 |

FOREIGN PATENTS

| | | |
|---|---|---|
| 90,370 | 9/1937 | Sweden. |

ROBERT E. BAGWILL, *Primary Examiner.*